United States Patent
Kaminsky et al.

(10) Patent No.: US 10,454,767 B2
(45) Date of Patent: *Oct. 22, 2019

(54) AUTONOMIC ASSISTANCE FOR POLICY GENERATION

(71) Applicant: SailPoint Technologies Holdings, Inc., Austin, TX (US)

(72) Inventors: David L. Kaminsky, Chapel Hill, NC (US); David M. Ogle, Cary, NC (US)

(73) Assignee: Sailpoint Technologies Holdings, Inc., Austin, TX (US)

( * ) Notice: Subject to any disclaimer, the term of this patent is extended or adjusted under 35 U.S.C. 154(b) by 969 days.

This patent is subject to a terminal disclaimer.

(21) Appl. No.: 13/732,497

(22) Filed: Jan. 2, 2013

(65) Prior Publication Data

US 2013/0185407 A1 Jul. 18, 2013

Related U.S. Application Data

(62) Division of application No. 10/635,587, filed on Aug. 6, 2003, now Pat. No. 8,386,272.

(51) Int. Cl.
*G06F 15/173* (2006.01)
*H04L 12/24* (2006.01)
*H04L 29/06* (2006.01)
*G06N 5/02* (2006.01)

(52) U.S. Cl.
CPC .......... *H04L 41/0893* (2013.01); *G06N 5/02* (2013.01); *H04L 41/00* (2013.01); *H04L 63/108* (2013.01)

(58) Field of Classification Search
CPC ... H04L 41/00; H04L 12/244; H04L 41/0893; H04L 63/108
USPC ...................... 705/1; 709/220, 223, 224, 230
See application file for complete search history.

(56) References Cited

U.S. PATENT DOCUMENTS

| | | | |
|---|---|---|---|
| 4,979,118 A | | 12/1990 | Kheradpir |
| 5,557,747 A | * | 9/1996 | Rogers et al. ............... 709/223 |
| 5,889,953 A | | 3/1999 | Thebaut et al. |
| 6,167,445 A | * | 12/2000 | Gai et al. ..................... 709/223 |
| 6,170,015 B1 | | 1/2001 | Lavian |

(Continued)

FOREIGN PATENT DOCUMENTS

JP 2001086152 A 3/2001

OTHER PUBLICATIONS

F. Ogel et al, "C/SPAN: a Self-Adapting Web Proxy Cache," 2003, IEEE Computer Society, Autonomic Computing Workshop Fifth Annual International Workshop on Active Middleware Services, pp. 1-8.*

*Primary Examiner* — Aaron N Strange

(74) *Attorney, Agent, or Firm* — Sprinkle IP Law Group

(57) ABSTRACT

A system, method and apparatus for autonomically assisting in the creation of an administrative policy. The method can include detecting a stimuli in a system under study and monitoring a response by a systems administrator to the stimuli. The stimuli and the response can be forwarded to a policy maker suited to analyze the stimuli and the response. Also, the policy maker can be queried for a preferred response to the stimuli. Based upon the preferred response to the stimuli, a policy for responding to the stimuli can be formulated. As such, the policy can be enforced in managing the system under study. Moreover, the policy can be forwarded for future consideration to the systems administrator.

10 Claims, 2 Drawing Sheets

(56) References Cited

U.S. PATENT DOCUMENTS

| | | | |
|---|---|---|---|
| 6,311,175 B1 * | 10/2001 | Adriaans | G06F 11/3447 |
| | | | 706/25 |
| 6,412,000 B1 | 6/2002 | Riddle et al. | |
| 6,460,141 B1 * | 10/2002 | Olden | 726/4 |
| 6,473,794 B1 * | 10/2002 | Guheen et al. | 709/223 |
| 6,484,261 B1 * | 11/2002 | Wiegel | H04L 41/0856 |
| | | | 715/763 |
| 6,615,166 B1 * | 9/2003 | Guheen et al. | 703/27 |
| 7,363,515 B2 * | 4/2008 | Frazier | G06F 21/316 |
| | | | 342/13 |
| 7,581,012 B2 * | 8/2009 | Shiouchi | H04L 41/0893 |
| | | | 709/202 |
| 2001/0044841 A1 | 11/2001 | Kosugi et al. | |
| 2002/0095524 A1 * | 7/2002 | Sanghvi | G06F 9/542 |
| | | | 719/318 |
| 2002/0107958 A1 | 8/2002 | Faraldo, II | |
| 2002/0161706 A1 | 10/2002 | Brinskele et al. | |
| 2003/0014540 A1 * | 1/2003 | Sultan | H04L 45/02 |
| | | | 709/240 |
| 2003/0018792 A1 * | 1/2003 | Shiouchi | H04L 41/0893 |
| | | | 709/229 |
| 2003/0041131 A1 | 2/2003 | Westerinen et al. | |
| 2003/0115218 A1 * | 6/2003 | Bobbitt | G06F 17/30233 |
| 2004/0064735 A1 * | 4/2004 | Frazier | G06F 21/316 |
| | | | 706/16 |
| 2004/0064806 A1 * | 4/2004 | Johnston-Watt et al. | 717/124 |
| 2004/0122823 A1 * | 6/2004 | Baffes et al. | 707/100 |

* cited by examiner

AUTONOMIC ASSISTANCE FOR POLICY GENERATION

This application is a Divisional of U.S. application Ser. No. 10/635,587, filed on Aug. 6, 2003, now U.S. Pat. No. 8,386,272, entitled "AUTONOMIC ASSISTANCE FOR POLICY GENERATION," the entirety of which is incorporated herein by reference.

BACKGROUND OF THE INVENTION

Statement of the Technical Field

The present invention relates to the field of autonomic computing and more particularly to policy based autonomic management of a system.

Description of the Related Art

The task of modern systems administration differs significantly from that of days gone by. Not just a decade ago, systems administration primarily entailed the addition and deletion of users within the system, the management of print queues, disk maintenance, and the supervision and operation of daily backup procedures. Most if not all resources required by applications remained present in a single network, and few if any applications depended upon the operation of other, co-executing applications. In fact, the notion of an enterprise application, as compared to a mere network application remained largely within the realm of academia as a decade ago, the enabling technologies had not advanced enough in terms of speed and reliability to facilitate true enterprise computing.

Much has changed since the early days of network computing. Today, enterprise computing permeates the electronic landscape. While some enterprise applications remain largely stand-alone, most rely in some respect on a co-existing enterprise application or a soft enterprise resource, such as a database application, Web application server, or other cooperating component. Thus, systems administration has advanced far beyond user and print queue administration and daily backup routines. Today, the interdependencies among system components present a significant challenge to the administrator. In this regard, the management of a single component in the system can depend upon the state of a multiplicity of other components. Thus, in administering the system, a seemingly endless array of administrative choices abound.

The task of systems administration recently has grown to include policy based management principles. Policy based management principles initially included rules for authentication only. Specifically, the rules specified which users defined within the system were permitted to perform which administrative tasks upon which components. Typically, the authority to perform such administrative tasks represents the sole type of rule managed by policy within the enterprise. Yet, more recent policy based management principles relate more specifically to the automated monitoring and maintenance of the system. In particular, policy based management has formed the cornerstone of "autonomic" systems administration.

In the famed manifesto, *Autonomic Computing: IBM's Perspective on the State of Information Technology*, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.

Importantly, in accordance with the eight tenants of autonomic computing, several single system and peer-to-peer systems have been proposed in which self-configuration, management and healing have provided a foundation for autonomic operation. Self-managing systems which comport with the principles of autonomic computing reduce the cost of owning and operating computing systems. Yet, implementing a purely autonomic system has proven revolutionary. Rather, as best expressed in the IBM Corporation white paper, Autonomic Computing Concepts (IBM Corporation 2001) (hereinafter, the "IBM White Paper"), "Delivering system-wide autonomic environments is an evolutionary process enabled by technology, but it is ultimately implemented by each enterprise through the adoption of these technologies and supporting processes."

In the IBM White Paper, five levels have been logically identified for the path to autonomic computing. These five levels range from the most basic, manual process to the most purely autonomic. The Basic Level of autonomic computing represents a starting point of information technology environments. Each infrastructure element can be managed independently by an administrator who can establish, configure, monitor and ultimately replace the element. At the Managed Level of autonomic computing, systems management technologies can be used to collect information from disparate systems onto fewer consoles, reducing the time consumed for the administrator to collect and synthesize information as the environment becomes more complex.

Notably, the Predictive Level incorporates new technologies to provide a correlation among several infrastructure elements. These infrastructure elements can begin to recognize patterns, predict the optimal configuration of the system, and provide advice as to the nature of the course of action which the administrator ought to take. By comparison, at the Adaptive Level the system itself can automatically perform appropriate actions responsive to the information collected by the system and the knowledge of the state of the system. Finally, at the Autonomic Level the entire information technology infrastructure operation is governed by business policies and objectives. Users interact with the autonomic technology only to monitor the business processes, alter the objects, or both.

In the Predictive Level of autonomic systems administration, a system administration component can monitor the courses of action performed by a systems administrator in response to specific stimuli. Based upon the courses of action performed by the systems administrator, the system administration component can formulate a policy for autonomically responding to the same stimuli when in an Adaptive or Autonomic mode. The assumption that the systems administrator has performed appropriately responsive to the stimuli, however, may not always be a correct assumption. In many cases, the systems administrator lacks the experience to select the most optimal course of action. Moreover, in many cases, the systems administrator ought to consult with a more knowledgeable administrator in regard to the specific stimuli. Yet, often consultations are the exception rather than the rule. Thus, in the quest for more automation for efficiency, efficiency can be lost due to improper human decision making.

SUMMARY OF THE INVENTION

The present invention addresses the deficiencies of the art in respect to autonomic systems administration and provides a novel and non-obvious method, system and apparatus for autonomically assisting in the generation of a systems administration policy. A system for autonomically assisting in the creation of an administrative policy can include a systems administration component coupled to a system under study. A workflow component can be configured for communicative linkage to one or more policy makers. Specifically, the workflow component can include a further configuration for routing stimuli and response data from the system under study to a selected one of the policy makers based upon an affiliation between the selected policy maker and a portion of the system under study. Finally, a policy generation component can be coupled to the workflow component and configured to generate an administrative policy for administering the system under study based upon data collected from the selected one of the policy makers for the stimuli and response data.

A method for autonomically assisting in the creation of an administrative policy can include detecting a stimuli in a system under study and monitoring a response by a systems administrator to the stimuli. The stimuli and the response can be forwarded to a policy maker suited to analyze the stimuli and the response. Also, the policy maker can be queried for a preferred response to the stimuli. Based upon the preferred response to the stimuli, a policy for responding to the stimuli can be formulated. As such, the policy can be enforced in managing the system under study. Moreover, the policy can be forwarded for future consideration to the systems administrator.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for autonomically assisting in the generation of a policy for use in the autonomic administration of a system. In accordance with the present invention, a systems administration component can monitor both stimuli generated in the system under study, and the response to the stimuli by a responding systems administrator. By stimuli it is meant that a particular situation has arisen giving rise to an uncertainty within the system in respect to how to proceed. A typical situation might include "disk is full", "backup scheduled" or "shutdown of database requested". In essence, a situation can arise when a state is encountered in the system which requires administration by the systems administrator. Similarly, by response it is meant that a particular course of action is chosen, such as "empty trash", "conduct backup", or "backup database before honoring shutdown request". Again, a response can include any course of action taken by the systems administrator in response to the stimuli.

Both the stimuli and the response can be stored for subsequent reference by a workflow process. In the workflow process, the stimuli and response can be routed to a qualified policy maker who can be queried for a suitable response in addition to other supplementary information. Other supplementary information can include, but is not limited to, related stimuli, related responses, and related systems in which the stimuli might arise. Based upon the data provided by the policy maker in response to the query, a policy can be formulated which can include a set of rules for responding to the stimuli. Subsequently, the policy can be established for use in an autonomic portion of the systems administration component. Additionally, the policy can be provided to the systems administrator as well as the policy maker.

Figure 1:
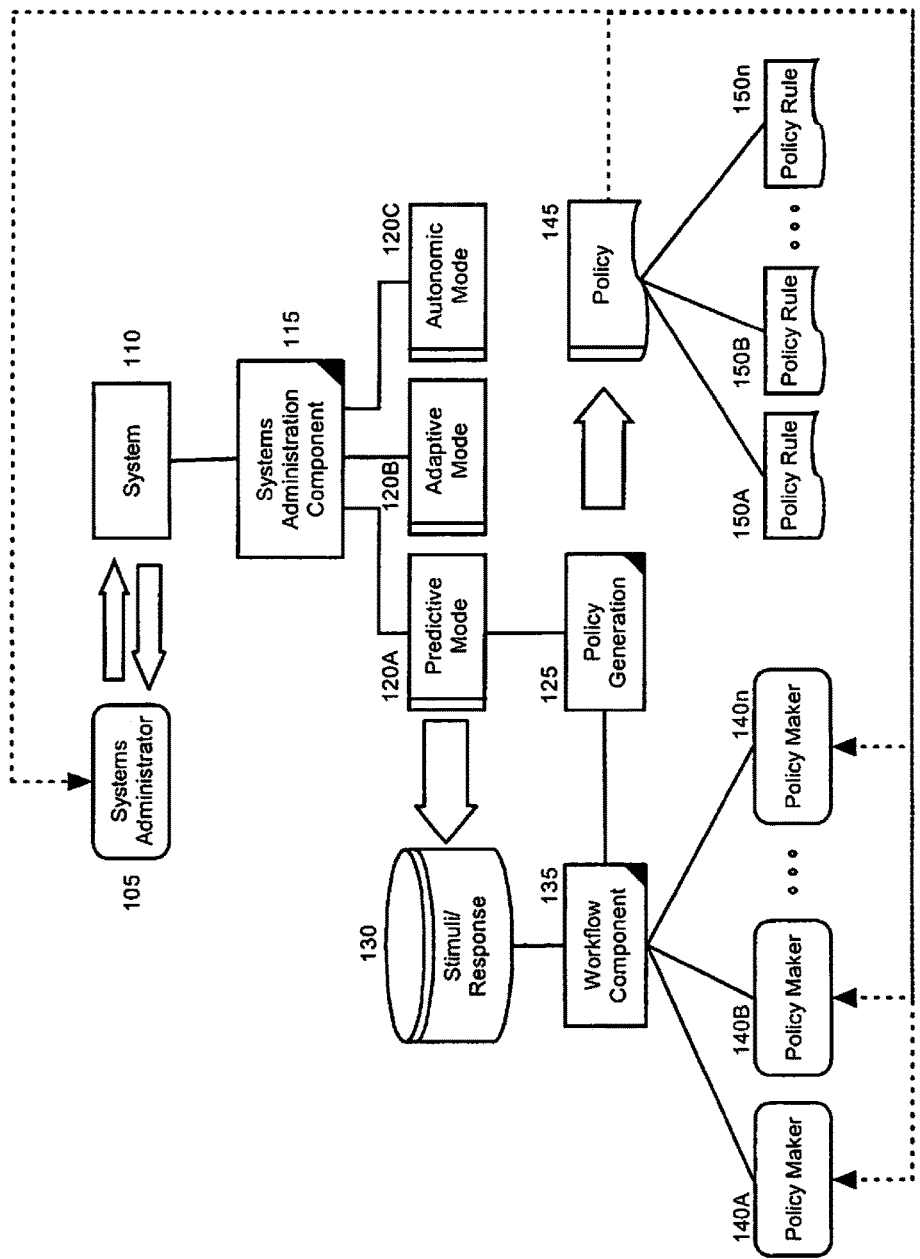
FIG. 1 is block diagram illustrating a system for autonomically assisting in the generation of a policy for use when responding to a particular stimulus.

FIG. 1 is block diagram illustrating a system for autonomically assisting in the generation of a policy for use when responding to a particular stimulus. The system of the present invention can include a systems administration component 115 coupled to a system under study 110. The systems administration component 115 can be configured in a number of modes which can include a predictive mode 120A, an adaptive mode 120B and an autonomic mode 120C. Other modes can be included such as a basic mode or a managed mode (neither shown), though the invention is not limited to any particular defined mode. Rather, as it will be apparent to the skilled artisan, the modal operation of the systems administration component 115 can be autonomic in respect to the formulation of a policy which can be utilized autonomically by the systems administration component 115, or manually by a systems administrator 105.

A policy generation process 125 can be coupled to both a data store of stimuli/responses 130 and a workflow process 135. The data store of stimuli/responses 130 can include a collection of stimuli flowing from the operation of the system 110, and the responses performed by the systems administrator 105. The workflow process 135 can be configured to route selected ones of the stimuli and responses to one or more policy makers 140A, 140B, 140n. The policy makers 140A, 140B, 140n can be administrators skilled in particular aspects of systems administration, business personnel qualified to analyze economic tradeoffs in selecting among suitable alternative courses of action, or some combination thereof. A table of policy makers and particular stimuli (not shown) can be established so that the workflow process 135 can route workflow requests relating to particular stimuli to suitable ones of the policy makers 140A, 140B, 140n. Alternatively, the situation can be routed to a person (not shown) qualified to make the routing decision.

Based upon data provided by the policy makers 140A, 140B, 140n in analyzing routed ones of the workflow requests, the policy generation process 125 can produce a policy 145 having one or more rules 150A, 150B, 150n for handling the particular stimuli at hand. Specifically, the rules 150A, 150B, 150n can specify not only a preferred response to the stimuli, but also the rules can account for related stimuli and can include related actions. Finally, the policy 145 can be earmarked not only for the system under study 110, but also the policy 145 can be earmarked for use with other systems as specified by the policy makers 140A, 140B, 140n. Ordinarily, once formulated, the policy 145 can be shared with the systems administrator 105 and the policy makers 140A, 140B, 140n. Moreover, the policy 145 can be utilized by the systems administration component 115 when placed in a more autonomic mode.

Figure 2A:
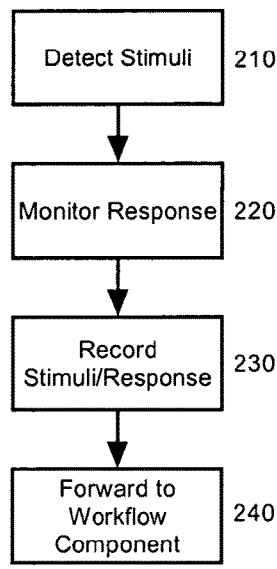
FIG. 2A is a flow chart illustrating a process for referring stimuli/response data to a workflow component in the system of FIG. 1; and, FIG. 2B is a flow chart illustrating a process for generating a policy responsive to stimuli/response data received in the system of FIG. 1.

FIG. 2A is a flow chart illustrating a process for referring stimuli/response data to a workflow component in the system of FIG. 1. Beginning in block 210, a stimuli can be detected in the system under study, and a response to the stimuli by a systems administrator further can be monitored in block 220. In block 230, both the stimuli and the response can be stored for reference by a policy generation component in FIG. 2B. Finally, in block 240 a notification of the stimuli/response can be forwarded to a workflow component for routing to a suitable policy maker in which a policy can be generated for the stimuli.

Figure 2B:
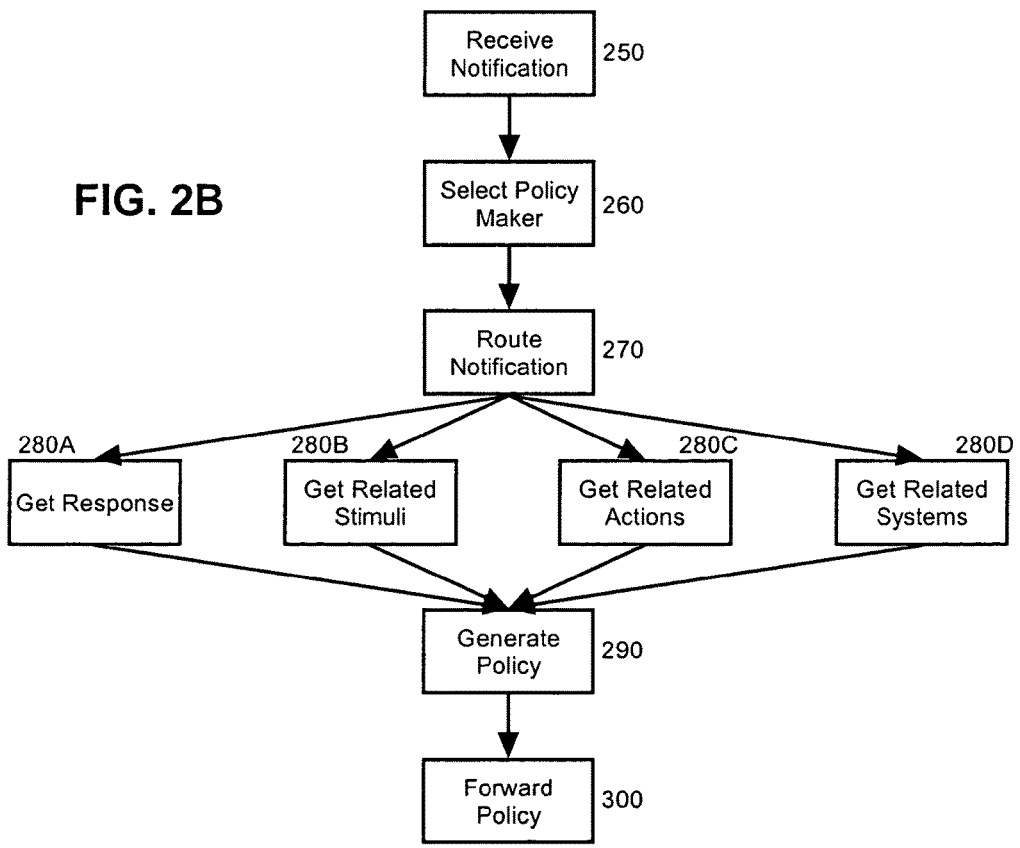

FIG. 2B is a flow chart illustrating a process for generating a policy responsive to stimuli/response data received in the system of FIG. 1. Beginning in block 250, the notification of the stimuli/response can be received. In block 260, a suitable policy maker can be selected for the stimuli at hand. Specifically, the workflow component can refer to a pre-configuration in which certain policy makers have been associated with at least a particular stimuli, a particular system, a particular type of response, or a particular portion of a system. Once identified, in block 270 the stimuli/response can be routed to the selected policy maker.

In this regard, in blocks 280A through block 280O, the selected policy maker can be queried on any number of levels which can range from identifying a preferred response to the stimuli (block 280A) through identifying related actions 280C, systems 280D, and stimuli 280B. Preferably, the selected policy maker can be queried through a series of dialog box frames, though the invention is not limited to the precise arrangement for presenting the queries to the selected policy maker. In any event, the response to the queries can be formulated into a policy in block 290 and in block 300 the policy can be distributed to the appropriate systems for enforcement. Subsequently, the resulting performance of the policy can be monitored and reported not only to the systems administrator, but also to the selected policy maker.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for autonomically assisting in the creation of an administrative policy comprising:
   a computer communicatively coupled to a system under study, the computer comprising at least one processor and a memory comprising:
   a systems administration component executing in the memory of the computer and configurable in a number of modes comprising a predictive mode, an adaptive mode and an autonomic mode, the systems administration component comprising program code enabled to enter the predictive mode in which the program code is operable during execution by the at least one processor to detect a stimuli in the system under study and to monitor a response by a systems administrator to said stimuli, the stimuli being a particular computing situation in the system under study in which an uncertainty exists for how to proceed in order to redress the particular computing situation, and the response being a particular course of action taken in response to the stimuli so as to perform the redress;
   a workflow component executing in the memory of the computer and coupled to a policy generation component and a data store of stimuli/responses comprising a collection of stimuli flowing from operation of the system under study and responses performed by the systems administrator, the workflow component comprising program code enabled to forward said stimuli and said response to a policy maker suited to analyze said stimuli and said response specified in a table of policy makers and particular stimuli, and to query said policy maker for a preferred response to said stimuli; and, the policy generation component executing in the memory of the computer, the policy generation component comprising program code enabled to formulate a policy for responding to said stimuli based upon said preferred response;

the program code of the systems administration component being further operable during execution by the at least one processor to enter subsequent to the predictive mode, an autonomic mode during which the program code utilizes the formulated policy to respond to said stimuli based upon said preferred response without requiring intervention by the systems administrator.

2. The system of claim 1, further comprising a data store of stimuli and responses in said system under study.

3. The system of claim 1, wherein the systems administration component further comprises program code enabled to enforce said policy in managing said system under study.

4. The system of claim 1, wherein the policy generation component further comprises program code enabled to forward said policy to said systems administrator.

5. The system of claim 1, wherein the systems administration component further comprises program code enabled to store said stimuli and response in a data store for subsequent analysis.

6. The system of claim 1, wherein the systems administration component further comprises program code enabled
to monitor the performance of said system under study in respect to said policy; and,
to report said monitored performance to at least one of said systems administrator and said policy maker.

7. The system of claim 1, wherein the workflow component further comprises program code enabled
to identify a policy maker among a plurality of policy makers, said identified policy maker having an association with at least one of said system under study, said stimuli and said response; and,
to route said stimuli and response to said identified policy maker.

8. The system of claim 1, wherein the workflow component further comprises program code enabled
to identify a policy maker among a plurality of policy makers, said identified policy maker having knowledge of another policy maker among said plurality of policy makers, said another policy maker having an association with at least one of said system under study, said stimuli and said response; and,
to route said stimuli and response to said identified policy maker, said identified policy maker further routing said stimuli and response to said another policy maker.

9. The system of claim 1, wherein the workflow component further comprises program code enabled to query said policy maker for at least one of an identity of a related stimuli, an identity of a related response, and an identity of a related system to which said policy can apply.

10. The system of claim 9, wherein the policy generation component further comprises program code enabled to formulate said policy additionally based upon said at least one of said identity of said related stimuli, said identity of said related response, and said identity of said related system to which said policy can apply.

* * * * *